US006862090B2

(12) United States Patent
Chen et al.

(10) Patent No.: US 6,862,090 B2
(45) Date of Patent: Mar. 1, 2005

(54) COAXIAL ILLUMINATION SYSTEM

(75) Inventors: Jianhui Chen, Fremont, CA (US); David M. Aikens, Pleasanton, CA (US)

(73) Assignee: Therma-Wave, Inc., Fremont, CA (US)

(*) Notice: Subject to any disclaimer, the term of this patent is extended or adjusted under 35 U.S.C. 154(b) by 287 days.

(21) Appl. No.: 09/927,068

(22) Filed: Aug. 9, 2001

(65) Prior Publication Data

US 2003/0030799 A1 Feb. 13, 2003

(51) Int. Cl.[7] .............................. G01J 3/00; G01J 3/42; G01J 3/28; G01J 4/00; G01N 21/00
(52) U.S. Cl. ...................... 356/300; 356/319; 356/328; 356/364; 356/369; 356/445; 250/225; 250/494.1; 250/578.1; 362/227
(58) Field of Search ................................ 356/300, 319, 356/328, 364, 369, 445; 250/225, 494.1, 578.1; 362/209, 210, 227

(56) References Cited

U.S. PATENT DOCUMENTS

| | | | | |
|---|---|---|---|---|
| 4,526,470 A | * | 7/1985 | Kaye ........................ | 356/319 |
| 4,611,143 A | | 9/1986 | Shimazu et al. ........... | 313/111 |
| 4,771,629 A | * | 9/1988 | Carlson et al. ............ | 73/23.35 |
| 5,686,993 A | | 11/1997 | Kokubo et al. ............ | 356/381 |
| 5,910,842 A | * | 6/1999 | Piwonka-Corle et al. ... | 356/369 |
| 6,268,917 B1 | * | 7/2001 | Johs .......................... | 356/369 |
| 6,456,373 B1 | | 9/2002 | Wienecke et al. ......... | 356/218 |
| 6,504,608 B2 | * | 1/2003 | Hallmeyer et al. ........ | 356/369 |
| 6,600,560 B2 | * | 7/2003 | Mikkelsen et al. ........ | 356/369 |
| 6,618,154 B2 | | 9/2003 | Engel et al. ............... | 356/503 |
| 2002/0024669 A1 | | 2/2002 | Danner et al. ............. | 356/369 |

FOREIGN PATENT DOCUMENTS

WO    WO 01/06173 A1    1/2001    ............. F21S/2/00

OTHER PUBLICATIONS

Hamamatsu Brochure, "Light Source," printed for Hamamatsu Photonics K.K., Jul. 1998, 20 pages in length.
Hamamatsu Brochure, "UV–VIS Fiber Light Source L7893 Series," printed for Hamamatsu Photonics K.K., Sep. 1999, 2 pages in length.
Hamamatsu Brochure, "L2D2 Lamps," printed for Hamamatsu Photonics K.K., Aug. 1998, 12 pages in length.

* cited by examiner

Primary Examiner—Zandra V. Smith
Assistant Examiner—Gordon J. Stock, Jr.
(74) Attorney, Agent, or Firm—Stallman & Pollock LLP

(57) ABSTRACT

A method and apparatus for combining the spectral outputs of multiple light sources to provide a high-efficiency broad-band illuminator for optical metrology is disclosed. The illuminator combines the output radiation from a plurality of broad-band lamps in a novel optical arrangement that creates a virtual source and avoids the use of beam-splitters. Consequently, the illuminator offers increased performance at reduced cost. The illuminator can be optimized and configured for application in a broad class of optical metrology instruments.

46 Claims, 4 Drawing Sheets

COAXIAL ILLUMINATION SYSTEM

TECHNICAL FIELD

The subject invention is a broad-band illumination system for use in optical metrology instruments. The illuminator uses a combination of two lamps with different spectral outputs, arranged such that light from the first lamp is collected and transmitted through the second lamp. Consequently, the illuminator offers higher intensity than conventional designs since it avoids the use of optical beam-splitters.

BACKGROUND OF THE INVENTION

In the prior art there has been considerable effort expended in extending the spectral band-width, or wavelength range, of a broad class of optical metrology instruments. Non-contact, optical measurements are heavily utilized in the optics, optical communications and semiconductor industries. The instruments are used in the evaluation and characterization of samples that can include spatially non-uniform distributions of a broad class of materials including, insulators, semiconductors and metals; consequently, the optical properties of these samples can vary markedly with wavelength. Hence, in general, a much greater wealth of information can be extracted from broadband spectroscopic measurements than can be obtained from measurements made over a narrow spectral range. One approach to implementing broad-band spectroscopic measurements is set forth in WO 99/02970 which is incorporated herein by reference.

Additionally, the drive to reduce minimum feature size or critical dimensions in semiconductor manufacturing has forced lithography systems to employ ever-decreasing exposure wavelengths. At present, leading-edge industrial lithography systems operate in the DUV over a narrow wavelength region of approximately 193 nm. In the near future systems will operate in the vacuum ultra-violet at a wavelength of 157 nm. The next generation lithography systems are expected to operate in the extreme ultraviolet at 13 nm. Consequently, to keep pace with the manufacturing technology, optical metrology system manufacturers must continually extend the spectral range of measurement systems to shorter measurement wavelengths. Ideally, the wavelength extension results in an increase the measurement band-width of the metrology system.

In the prior art, optical metrology systems that operate over the spectral range spanning the DUV and visible utilize two lamps; a Deuterium lamp for spectroscopic measurements between 190 and 400 nm, and a Xenon lamp for measurements between 400 nm and 800 nm. There are several benefits to this approach. First, the design of the individual lamps can be optimized to tailor the spectral emission over a narrow spectral range simplifying the lamp design. Second, the use of two lamps insures the ability to perform measurements using illumination with the desired bandwidth; avoiding harmonic contamination of the illumination and minimizing unnecessary UV exposure of both the sample and the system optics. For example, UV illumination is admitted to the measurement beam path only when UV measurements are to be performed. This latter feature is most desirable since it minimizes the potential for UV damage to the sample and solarization of the system optics and samples.

In a typical two lamp arrangement each lamp is located in its own housing, and the lamps are arranged so that a part of the illumination from both lamps can be directed along a common optical path to illuminate the sample to be measured. This generally has involved the use beam-splitters, optical elements that partially reflect and partially transmit the incident beam to combine the beams from the two sources. The use of beam splitters necessarily reduces the light intensity reaching the sample since a portion of the useful optical output of each lamp is discarded. Reduced intensity at the sample can result in lower measurement accuracy, increased measurement time and lower system throughput. These effects may be mitigated by using higher output lamps to compensate for the system losses. However, higher output lamps are more expensive and generate higher thermal loads increasing both the capital and operational costs of the metrology system.

Accordingly it would be desirable to provide an illumination system employing two or more lamps that avoids the use of beam splitters yet permits combination of the lamp outputs with the combined output directed along a common optical path. Such an illumination system would be useful to combine the light output of two or more lamps having different spectral output characteristics. Alternatively, where it is desired to increase the light intensity reaching the sample, the subject illumination system can also be used to combine the output of two or more lamps having substantially similar spectral output characteristics.

SUMMARY OF THE INVENTION

The subject invention relates to a broad-band illuminator for illuminating a sample in an optical metrology apparatus. The illuminator has two light sources, three optical systems and an aperture. The first light source emits radiation over a first broad band emission spectrum. A portion of the radiation emitted by the first source is collected by the first optical system and focused through the second light source to a first focal position. The second light source is substantially transparent over a portion of the emission spectrum of the first source. The second light source emits radiation over a second broad-band emission spectrum which could be the same or different from the first broad-band emission spectrum.

The second optical system is located downstream from the second light source and performs two functions. First, it collects a portion of the light emitted by the second light source and focuses it at a second focal position. Second, it relays light from the first focal position to the second focal position.

The aperture is placed at the second focal position. The third optical system collects the light transmitted through the aperture and focuses it on the sample. Therefore, the first light source, the second light source, the first optical system, the second optical system and the aperture comprise a virtual source of illumination located at the aperture. The spectral output of the virtual source is the sum of the emission spectrum of the second light source and that portion of the emission spectrum of the first light source transmitted through the second light source. Thus the invention permits the combination of the spectral outputs of two lamps while avoiding the losses associated with beam splitters.

Those of ordinary skill in the art will further recognize that the virtual source architecture has other significant advantages. First, it markedly reduces stray light in the optical system, particularly at the sample position, resulting in improved system sensitivity and higher system throughput. Second, the optical system is relatively insensitive to small variations in lamp position consequently the individual lamps can be replaced without optical re-alignment. By this arrangement routine maintenance is simplified and system down-time is minimized. Thus, the illuminator offers higher throughput, reduced stray light, simplified lamp replacement and reduced system down-time at reduced cost.

DETAILED DESCRIPTION OF THE PREFERRED EMBODIMENTS

Figure 1:
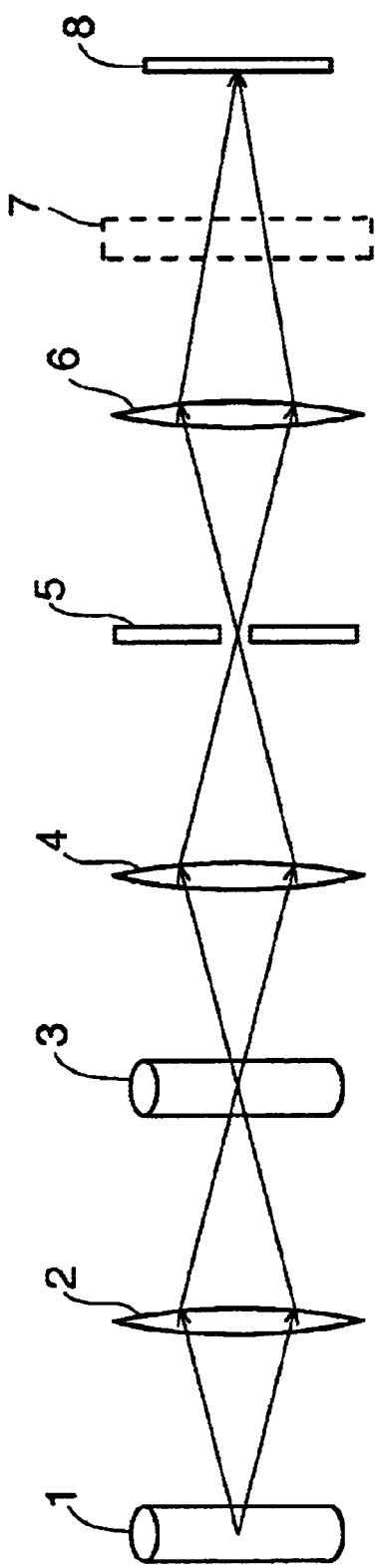
FIG. 1 schematically illustrates the basic illuminator concept.
Figure 2:
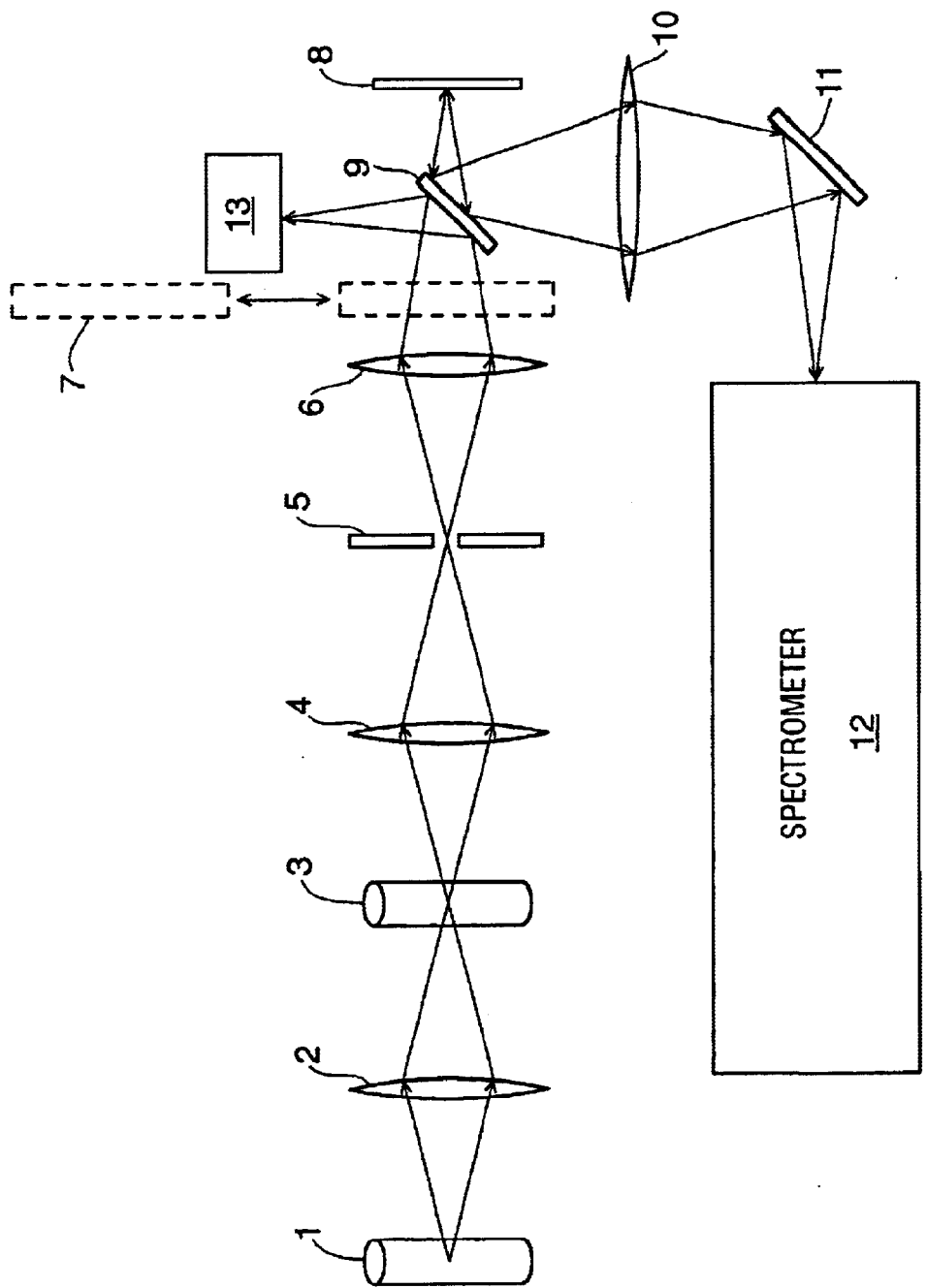
FIG. 2 schematically illustrates implementation of the illuminator in a spectroscopic reflectometer.
Figure 3:
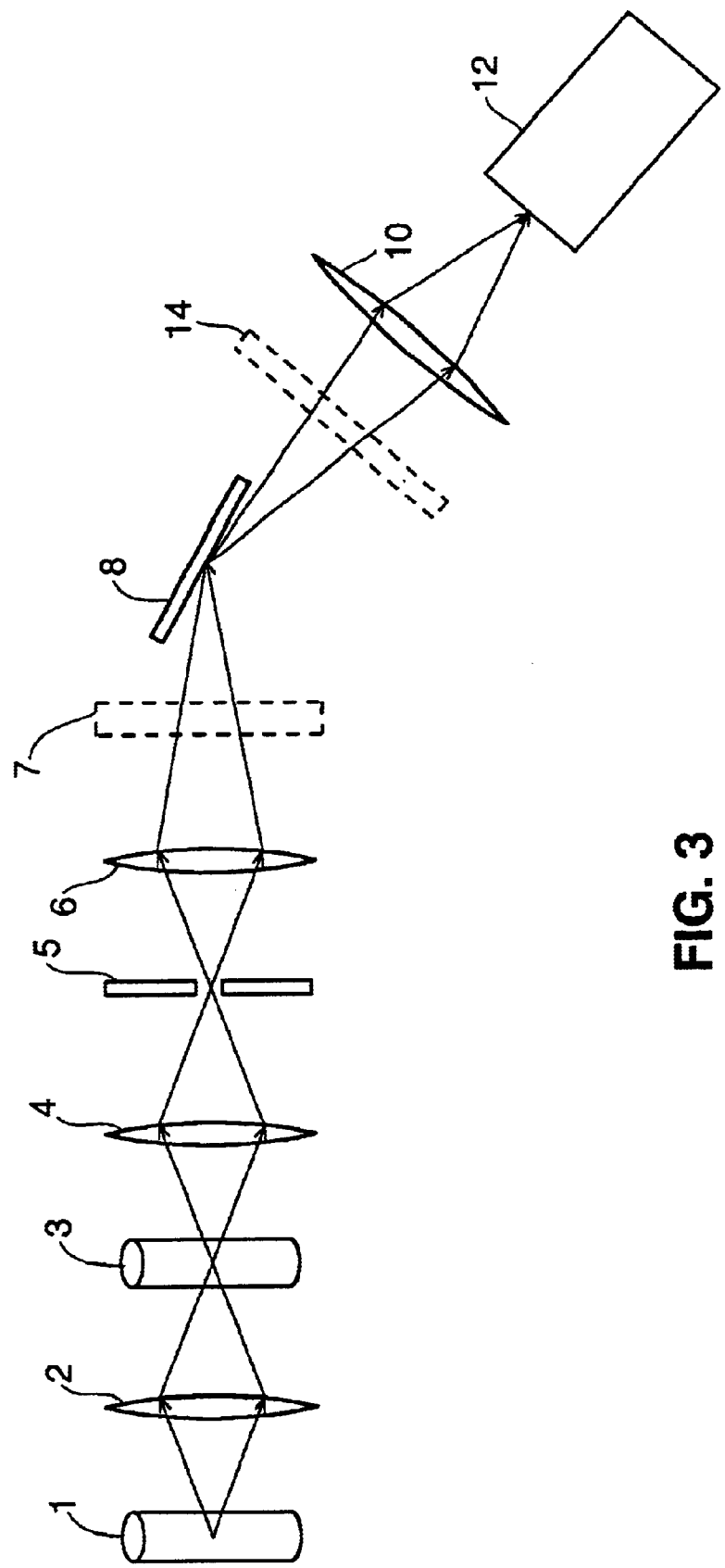
FIG. 3 schematically illustrates implementation of the illuminator in a spectroscopic ellipsometer.

FIGS. 1—3 are schematic and a simplified optical representation has been used to reduce the complexity of the drawings. Herein individual optical components are used to represent functional elements that may be quite complex. For example, a lens in these figures represents an optical system for collecting and focusing light. The physical embodiment of the optical system may employ multiple lenses in multiple groups.

FIG. 1 illustrates one embodiment of the illuminator configured to illuminate a sample with focused, broad-band radiation. Referring to FIG. 1, a portion of the radiation emitted from a broad-band, randomly polarized light source 1, is collected by optical system 2 and brought to a focus. A second broad-band, randomly polarized light source 3 is placed at the focal position of optical system 2. Light source 3 is substantially transparent over the emission spectrum of source 1 and transmits the focused radiation.

Optical system 4 performs two functions. First, it collects a portion of the radiation emitted by lamp 3 and focuses the light onto aperture stop 5. Second, optical system 4 simultaneously relays the image of source 1 onto aperture stop 5. Therefore, the two light sources (1,3), optical systems (2,4) and aperture 5 constitute a virtual broad-band light source located at the aperture stop with a spectral output that is the sum of the emission spectra of the individual broad-band sources. Optical system 6 focuses the radiation transmitted through aperture 5 onto the sample 8. A polarizing system 7 may be inserted into the optical path such that optical system 6 forms a polarized image of the aperture 5 onto the sample 8. With polarizing optics system 7 removed, optical system 6 forms an unpolarized image of the virtual source on the sample. In the preferred embodiment light source 3 is placed at the focal position of optical system 2, however, the light source can be placed at any position where that portion of the radiation emitted by light source 1 used to illuminate the sample is transmitted through light source 2.

The illuminator can be employed to increase both the spectral bandwidth and intensity of the illumination by combining the outputs of multiple sources. If light sources with substantially identical spectral outputs are located at source positions 1 and 3, the illuminator combines the output of those sources and increases the illumination intensity over the selected wavelength range. For example, increased intensity over the spectral range spanning 190–400 nm could be obtained when two deuterium lamps are installed at the source positions. Note that the deuterium lamp at source position 1 could be of conventional construction while the deuterium lamp at source position 3 would need to be of the type that is substantially transparent to the UV output of the first lamp.

If spectrally distinct lamps are located at the source positions the spectral width of the illuminator is the sum of the spectral widths of the individual sources. For example, installation of a tungsten lamp at the source position 1 and a deuterium lamp at source position 3 results in a virtual source that spans the spectral range from 190 to 900 nm. In this latter configuration the tungsten and deuterium sources can be operated sequentially to minimize UV exposure of the sample and system optics.

It should be noted that if the spectral output of lamp at source position 3 is substantially similar to the spectral output of lamp at source position 1, the gas in the lamp at position 3 might absorb a portion of the light output from the upstream lamp. Accordingly, it may be desirable to use two lamps with slightly different output characteristics so that the absorption characteristics of the lamp in position 3 do not match the spectral output of the lamp in position 1. The geometry or structure of the lamp at position 3 can also be arranged to minimize absorption.

The arrangement of FIG. 1 permits the use of a broad variety of light sources including incandescent, discharge, laser and amplified stimulated emission sources. The illuminator can incorporate sources which span at least a portion of the extreme ultra-violet, deep ultra-violet, ultraviolet, visible, near infra-red and infra-red spectral ranges. In the preceding discussion a dual source illuminator has been used to illustrate the concepts and advantages of the invention. One of ordinary skill in the art will recognize that the incorporation of additional sources is an obvious extension of the concept. For example, one can add a third light source upstream of source 1. In this case, source 1 would need to be substantially transparent to the radiation emitted from the third source. In addition, another optical system would be necessary to focus the light from the new source into the focal plane of source 1. Focal system 2 would be used not only to focus the light from source 1, but also to relay the image from the new source. Additional light sources could be added in this manner.

Similarly, one of ordinary skill in the art will recognize that optical fiber, or optical fiber bundles can be used to relay the optical emission from sources placed at remote locations to lamp positions 1 and 3; this permits significant design flexibility with respect to source placement, yet preserves the salient advantages of the optical design.

Optical systems 2, 4 and 6 may be complex optical systems incorporating multiple elements arranged in multiple groups. At a minimum each optical system must incorporate at least one element selected from the group consisting of transmissive, diffractive, reflective and polarizing optics.

A polarizing optical system 7 may be inserted into the optical path to segregate polarization states and produce a polarized image of the aperture on the sample 8. In the preferred embodiment polarizing optical system 7 includes a Rochon prism. In this configuration the illuminator is suitable for application in polarized beam measurements including spectroscopic ellipsometry and polarized beam spectroscopic reflectometry and polarized beam scatterometry. When polarizer 7 is withdrawn from the optical path the image of the aperture is unpolarized. In this configuration the illuminator is suitable for application in spectroscopic reflectometry and scatterometry.

FIG. 2 illustrates use of the illumination system in a spectroscopic reflectometer. Elements 1 through 8 correspond to the illuminator of FIG. 1 and are defined in the preceding discussion. Beamsplitter 9 directs a portion of the incident radiation toward detector 13. The remainder of the radiation is focused onto the sample 8. The radiation interacts with the sample 8 and is reflected back toward the beamsplitter 9 which deflects a portion of the radiation through lens 10 which, in conjunction with fold mirror 11, images the radiation reflected from the sample onto the entrance slit of spectrometer 12. When polarizing system 7 is removed from the beam path, FIG. 2 represents a spectroscopic reflectometer. When polarizing system 7 is inserted into the light path, FIG. 2 represents a polarized beam spectroscopic reflectometer.

One of ordinary skill in the art will realize that insertion of an obscuration in the optical path of the reflected beam converts the spectroscopic reflectometer into a spectroscopic scatterometer. Furthermore, angle resolved scatterometry measurements can be made in this instrumental configuration with appropriate selection of the size and shape of the obscuration.

Detector 13 serves to spectrally separate the incident illumination and generate output signals proportional to the incident intensity at a plurality of wavelengths. In the preferred embodiment detector 13 includes a wavelength dispersive element such as a grating or a prism and a multiple element photo-detector array such as a CCD or photo-diode array. The output of detector 13 is used to normalize the output of spectrometer 12 in a conventional manner.

Spectrometer 12 includes wavelength dispersive components, gratings, prisms or the equivalent, that separate the incident radiation into a wavelength-dispersed spectrum. The wavelength-dispersed spectrum is detected by a photo-detector that generates output signals corresponding to the reflected intensity at a plurality of wavelengths. The detection system can be operated in two modes a high throughput parallel, broad-band detection mode and a high sensitivity, serial, narrow-band detection mode.

In the broad-band detection mode, spectrometer 12 incorporates a multiple element photo-detector array to simultaneously generate output signals corresponding to the reflected intensity at a plurality of wavelengths. In this embodiment the photo-detector is a multiple element photo-diode or charge-coupled-device (CCD) array.

In the narrow band detection mode the spectrometer is configured to transmit only a narrow-band spectrum of the radiation reflected from the sample to the detector such that the reflected intensity is detected over a narrow spectral range. The signal is measured at a given wavelength setting, the spectrometer is moved to the next wavelength setting and the signal is measured. This process is repeated until the spectrometer is sequentially scanned over the entire measured wavelength range. Here several detectors may be used including multiple element photo-diode arrays, multiple element CCD arrays, photo-diodes and photomultiplier tubes.

FIG. 3 illustrates the use of the illumination system in a spectroscopic ellipsometer. Elements 1 through 8 correspond to the illuminator of FIG. 1 and are defined in the preceding discussion. For spectroscopic ellipsometry applications polarizing system 7 is inserted into the beam path to set the polarization state of the broad-band illumination and the sample is illuminated at non-normal incidence. The incident radiation interacts with and reflects from the sample 8, this interaction alters the polarization state of the incident beam. Polarizing system 14 analyzes the polarization state of the reflected beam and optical system 10 images the radiation reflected from the sample onto the entrance slit of spectrometer 12.

In the preferred embodiment for spectroscopic ellipsometry applications, polarizing systems 7 and 14 are Rochon prisms, and they are installed such that the undeviated beam is along the optical path. Optical system 10 forms a polarized image of the sample at the entrance slit of spectrometer 12. Here optical system 10 is shown in a highly schematic and simplified form. In practice, optical system 10 may include multiple elements in multiple groups but must contain at least one element from the group consisting of transmissive, reflective, diffractive and polarizing optics.

Spectrometer 12 includes wavelength dispersive components, gratings, prisms or the equivalent, that separate the incident radiation into a wavelength-dispersed spectrum. The wavelength-dispersed spectrum is detected by a photo-detector that generates output signals corresponding to the change in polarization state at a plurality of wavelengths. Here as in the preceding discussion, the detection system can be designed to operate in the broad-band or narrow-band detection modes.

The components of FIG. 3 used for creating an initial polarization state and for analyzing the subsequent change in polarization state are only intended to demonstrate how the subject illumination system can be used for ellipsometry. A wide variety of ellipsometer systems are known that can benefit from the subject illumination system. Such known systems include rotating polarizers and rotating compensator systems. The scope of the subject invention is not intended to limited to a particular type of ellipsometer configuration. It should be noted that in FIG. 3, the polarizers 7 and 14 are shown inserted in a branch of the optics path where the beam is being focused. In a typical system, additional optics are often used so that polarizer can be located in a branch of the optics path were the beam is collimated in manner as shown in FIG. 4, discussed below.

Figure 4:
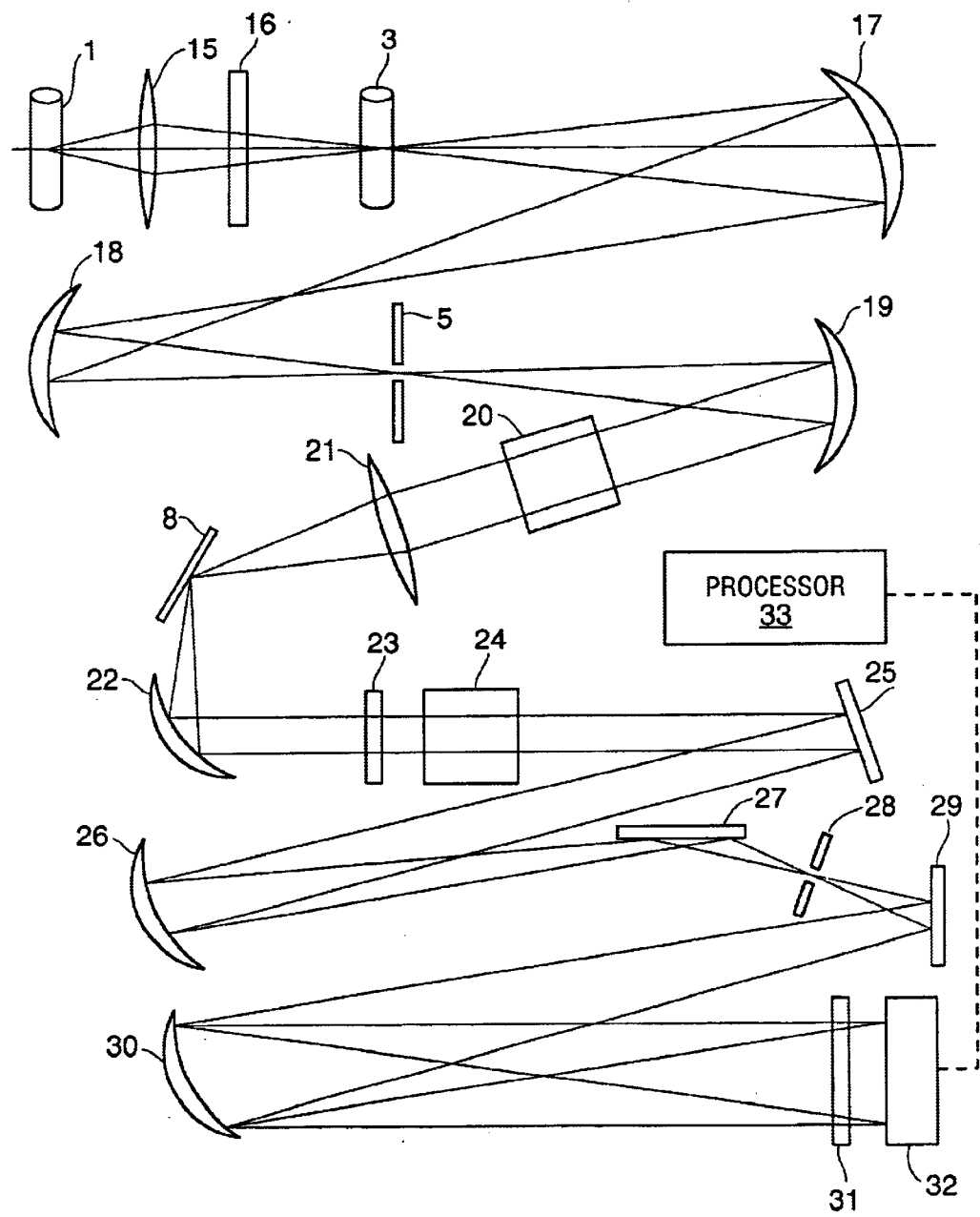
FIG. 4 schematically illustrates the illuminator in a spectroscopic ellipsometer in greater detail.

FIG. 4 illustrates the preferred embodiment of the illuminator in a spectroscopic ellipsometer. Light source 1 is a white light source that emits both visible and infra-red light over the spectral range spanning 400–900 nm. The source is substantially telecentric, free of aberrations and provides uniform illumination over the system pupils. Preferred embodiments include tungsten-halogen or Xe lamps. Alternatively, source 1 is the end face of an optical fiber arranged to transport the illumination from a remote light source to the light source 1 position. The fiber can be a single fiber or a fiber bundle.

Optical system 15 collects the radiation from the white light source and brings it to a focus at the location of UV source 3. The preferred embodiments of optical system 15 include systems with at least one refractive element with positive focusing power and systems with at least one reflective element with positive focusing power such as a torroidal or aspheric mirror. Spectral flattening filter 16 is designed to balance the infra-red and visible intensity to produce uniform white light illumination of sample 8 that is substantially independent of wavelength. This is achieved with a filter that has a transmission function that is inversely proportional to the spectral intensity of the white light illumination at the sample position in the absence of the filter. The preferred embodiment of filter 16 is a fused silica plate with a custom optical coating.

UV source 3 is substantially telecentric, free from aberration and provides uniform illumination over the system pupils. It is located so the center of the source is at the focal position of optical system 15 so that the image of the white light source and the UV source combine to form a single broad-band light source at the focus of optical system 15. In the preferred embodiment source 3 is a side-on deuterium arc lamp with an envelope that is substantially transparent in the visible and near-infra-red spectral regions. Such a source is available from Hamamatsu, Model L2D2 see-through lamps.

Mirrors 17 and 18 focus the radiation from the combined source onto aperture 5 such that the transmitted radiation appears to originate from a virtual source at the aperture position with a spectral band-width that is the sum of the individual sources. Mirrors 17 and 18 are substantially free of aberration and have high reflectance over the combined wavelength range spanned by the two sources 190–900 nm. In the preferred embodiment mirror 17 is an off-axis ellipsoid with positive focusing power and mirror 18 is an off-axis paraboloid with positive focusing power. The diameter of aperture 5 determines the beam size at the sample surface and is selected to insure adequate spatial separation of the polarization states of illumination reaching sample 8.

Mirror 19 collimates the light passing through aperture 5. The mirror is substantially free from aberration and has high reflectance over the wavelength range between 190 and 900 nm. In the preferred embodiment mirror 19 is an off-axis torroid or ellipsoid with positive focusing power. The collimated light is transmitted through polarizer 20 and focused onto sample 8 by optical system 21. Optical system 21 produces a polarized image of aperture 5 at sample 8. Optical system 21 is substantially free from aberrations and has high transmission over the wavelength range spanning 190–900 nm. Optical system 21 contains at least one refractive element with positive focusing power. In the preferred embodiment polarizer 20 is a Rochon prism and optical system 21 is a refractive triplet, color corrected using a combination of $CaF_2$ and fused silica lenses. Details of such a compound lens system suitable for focusing broad band light over the range is described in U.S. patent application Ser. No. 09/848733, filed May 3, 2001 and incorporated herein by reference.

The incident illumination interacts with and reflects from sample 8. The interaction changes the polarization state of the incident illumination. The reflected illumination is collected by collimating mirror 22 and transmitted through waveplate 23 and analyzer 24 arranged to analyze the polarization state of the reflected beam. Mirror 22 is substantially free from aberrations and has uniform reflectance over the wavelength region spanning 190 to 900 nm. In the preferred embodiment mirror 22 is an off-axis paraboloid and analyzer 24 is a Rochon prism. As noted above, a number of optical elements are available to create and then analyze the polarization state of the beam. One approach using a rotating compensator is described in U.S. Pat. No. 5,877,859, incorporated by reference.

Fold mirror 25 redirects the illumination toward mirrors 26 and 27 which focus the radiation onto pinhole 28. Fold mirror 29 reflects the radiation onto wavelength dispersive element 30. The energy dispersed radiation is transmitted through order sorting filter 31 and detected with detector 32. Detector 32 therefore generates output signals at a plurality of wavelengths that are proportional to the change in polarization state produced by the interaction of the incident illumination with the sample Processor 33 analyzes the outputs signals from detector 32 to determine the characteristics of sample 8.

In the preferred embodiment mirrors 22, 25, 26, 27 and 29 are substantially free from aberrations and highly reflective over the wavelength range spanning 190–900 nm. Mirrors 22 and 26 are off-axis paraboloids and mirrors 25, 27 and 29 are flats. The wavelength dispersive element 30 is a grating, although a prism can also be used. Detector 32 is a CCD array detector.

The various embodiments described in the preceding discussion can be combined on a common platform to comprise a single broad-band optical metrology instrument that incorporates several spectroscopic metrology capabilities including reflectometry, scatterometry and reflectometry. Here it is advantageous to provide a processor to analyze the output signals generated by the various detectors. The outputs correspond to changes in magnitude, changes in polarization state, changes in magnitude of polarized radiation and scatter measured at a plurality of wavelengths. The analysis protocols can treat the signals individually or in combination to evaluate the characteristics of a sample.

We claim:

1. A broad-band illuminator for illuminating a sample in an optical metrology apparatus comprising:
   a first light source emitting radiation over a first broad-band emission spectrum;
   a second light source emitting radiation over a second broadband emission spectrum, said second light source being substantially transparent over a portion of the first broadband emission spectrum;
   a first optical system for directing a portion of the radiation emitted from the first light source through the second light source and for focusing the radiation from the first light source to produce a first image of the first light source at a first focal position substantially coincident with the second light source;
   a second optical system for focusing a portion of the radiation emitted from the second light source to produce a second image of the second light source at a second focal position, and for relaying the first image of the first light source from the first focal position to the second focal position;
   an aperture placed at the second focal position; and
   a third optical system for focusing the radiation transmitted by the aperture onto the sample and creating an image of the aperture at the sample.

2. The illuminator of claim 1 where both first and second light sources are selected from the group consisting of incandescent, discharge, laser and amplified stimulated emission sources.

3. The illuminator of claim 1 where the first and second light sources are selected so that the first and second broad-band emission spectra span at least a portion of the infra-red, near-infra-red, visible, ultra-violet, deep ultraviolet, and extreme ultraviolet spectral ranges.

4. The illuminator of claim 1 where the first and second light sources are selected so that the first and second broad-band emission spectra span at least one of the infra-red, near-infra-red, visible, ultra-violet, deep ultraviolet, and extreme ultraviolet spectral ranges.

5. The illuminator of claim 1 where the second light source is selected so that the second broad-band emission spectrum is the same as that of the first light source.

6. The illuminator of claim 1 where the second light source is selected so that the second broad-band emission spectrum differs from that of the first light source.

7. The illuminator of claim 1 where the second broad-band emission spectrum differs from the first broad-band emission spectrum and both first and second light sources are selected from the group consisting of tungsten, tungsten-halogen, xenon, mercury, mercury-xenon, deuterium and hydrogen lamps.

8. The illuminator of claim 1 where the first light source is selected from the group consisting of tungsten, tungsten-halogen, xenon, mercury and mercury-xenon lamps and the second light source is a deuterium lamp.

9. The illuminator of claim 1 where the first light source is a deuterium lamp and the second light source is selected from the group consisting of xenon, mercury and mercury-xenon lamps.

10. The illuminator of claim 1 where the first light source is selected from the group consisting of tungsten and tungsten-halogen lamps and the second light source is selected from the group consisting of deuterium, xenon, mercury and mercury-xenon lamps.

11. The illuminator of claim 1 where the first and second light sources are Xe arc lamps.

12. The illuminator of claim 1 where the first and second light sources are deuterium lamps.

13. The illuminator of claim 1 where the first light source is a tungsten-halogen lamp and the second light source is a deuterium lamp.

14. The illuminator of claim 1 where the first light source is a Xenon lamp and the second light source is a deuterium lamp.

15. The illuminator of claim 1 where the first, second and third optical systems employ at least one element selected from the group consisting of transmissive optics, reflective optics diffractive optics and polarizing optics.

16. The illuminator of claim 1 where the optical metrology apparatus is selected from the group consisting of spectroscopic ellipsometers, spectroscopic reflectometers, and polarized beam spectroscopic reflectometers.

17. The illuminator of claim 1 where the first light source is a tungsten lamp and the second light source is a deuterium lamp.

18. The illuminator of claim 17 where said third optical system is arranged to segregate polarization states and form a polarized image of the aperture at the sample.

19. The illuminator of claim 13 where the third optical system includes a Rochon prism for segregating polarization states.

20. A method of illuminating a sample with broad-band radiation using two broad-band light sources, wherein the first light source emits radiation over a first broadband emission spectrum and wherein the second light source emits radiation over a second broadband emission spectrum, different from the first broadband emission spectrum, the second light source being substantially transparent over a portion of the first broad-band emission spectrum, comprising the steps of:

directing a portion of the radiation from the first light source through the second light source and focusing that radiation from the first light source to produce a first image of the first light source at a first focal position substantially coincident with the second light source;

focusing a portion of the radiation emitted from the second light source to produce a second image of the second light source at a second focal position coincident with an aperture, and for relaying the first image of the first light source from the first focal position to the second focal position; and directing the light transmitted through the aperture onto the sample in a manner to create an image of the aperture at the sample.

21. The method of claim 20 where both first and second light sources are selected from the group consisting of incandescent, discharge, laser and amplified stimulated emission sources wherein said first and second broad-band emission spectra span at least a portion of the infra-red, near-infra-red, visible, ultra-violet, deep ultraviolet, and extreme ultraviolet spectral ranges.

22. The method of claim 20 where the focusing and directing functions are achieved using at least one element selected from the group consisting of transmissive optics, reflective optics diffractive optics and polarizing optics.

23. The method of claim 20 wherein the illuminating function includes forming a polarized image of the aperture onto the sample.

24. The method of claim 20 used to illuminate a sample for optical characterization using at least one of the techniques selected from the group comprising spectrophotometry, spectroscopic scatterometry, spectroscopic reflectometry and spectroscopic ellipsometry.

25. An apparatus for evaluating characteristics of a sample comprising:

a first light source emitting radiation over a first broadband emission spectrum;

a second light source emitting radiation over a second broadband emission spectrum, said second light source being substantially transparent over a portion of the first broadband emission spectrum;

a first optical system for directing a portion of the radiation emitted from the first light source through the second light source and for focusing the radiation from the first light source to produce a first image of the first light source at a first focal position substantially coincident with the second light source;

a second optical system for focusing a portion of the radiation emitted from the second light source to produce a second image of the second light source at a second focal position, and for relaying the first image of the first light source from the first focal position to the second focal position;

an aperture placed at the second focal position;

a third optical system arranged to direct the radiation transmitted through the aperture onto the sample and for imaging the aperture at the sample;

a detection system for monitoring radiation reflected from the sample and generating output signals in response thereto; and a processor for evaluating the characteristics of the sample based on the detected output signals.

26. The apparatus of claim 25 where both first and second light sources are selected from the group consisting of incandescent, discharge, laser and amplified stimulated emission sources.

27. The apparatus of claim 25 where the first and second light sources are selected so that the first and second broad-band emission spectra span at least a portion of the infra-red, near-infra-red, visible, ultra-violet, deep ultraviolet, and extreme ultraviolet spectral ranges.

28. The apparatus of claim 25 where the first and second light sources are selected so that the first and second broad-band emission spectra span at least one of the infra-red, near-infra-red, visible, ultra-violet, deep ultraviolet, and extreme ultraviolet spectral ranges.

29. The apparatus of claim 25 where the second light source is selected so that the second broad-band emission spectrum is the same as that of the first light source.

30. The apparatus of claim 25 where the second light source is selected so that the second broad-band emission spectrum differs from that of the first light source.

31. The apparatus of claim 25 where the second broadland emission spectrum differs from the first broad-band emission spectrum and both first and second light sources are selected from the group consisting of tungsten, tungsten-halogen, xenon, mercury, mercury-xenon, deuterium and hydrogen lamps.

32. The apparatus of claim 25 where the first light source is selected from the group consisting of tungsten, tungsten-halogen, xenon, mercury and mercury-xenon lamps and the second light source is a deuterium lamp.

33. The apparatus of claim 25 where the first light source is a deuterium lamp and the second light source is selected from the group consisting of xenon, mercury and mercury-xenon lamps.

34. The apparatus of claim 25 where the first and second light sources are Xe arc lamps.

35. The apparatus of claim 25 where the first and second light sources are deuterium lamps.

36. The apparatus of claim 25 where the first light source is a tungsten lamp and the second light source is a deuterium lamp.

37. The apparatus of claim 25 where the first light source is a tungsten-halogen lamp and the second light source is a deuterium lamp.

38. The apparatus of claim 25 where the first light source is a Xenon lamp and the second light source is a deuterium lamp.

39. The apparatus of claim 25 where the first second and third optical systems employ at least one element selected from the group consisting of transmissive optics, reflective optics diffractive optics and polarizing optics.

40. The apparatus of claim 25 where said third optical system is arranged form a polarized image of the aperture at the sample.

41. The apparatus of claim 25 where the third optical system includes a Rochon prism for segregating polarization states.

42. The apparatus of claim 25 wherein the detection system is selected from the group consisting of spectrophotometers, spectroscopic reflectometers, spectroscopic scatterometers and spectroscopic ellipsometers.

43. The apparatus of claim 42 wherein the spectroscopic reflectometer is a polarized beam spectroscopic reflectometer.

44. The apparatus of claim 25 wherein the detection system is selected from the group consisting of: spectroscopic reflectometers for measuring the change in magnitude of the radiation at a plurality of wavelengths and spectroscopic ellipsometers for measuring the change in polarization state of the radiation at a plurality of wavelengths.

45. The apparatus of claim 25 wherein the detection system is selected from the group consisting of: polarized spectroscopic reflectometers for measuring the change in magnitude of polarized radiation at a plurality of wavelengths and spectroscopic ellipsometers for measuring the change in polarization state of the radiation at a plurality of wavelengths.

46. The apparatus of claim 25 wherein the detection system and processor operate to analyze, individually or in combination, output signals selected from the group consisting of: the change in magnitude of the radiation at a plurality of wavelengths, the change in polarization state of the radiation at a plurality of wavelengths, the change in magnitude of polarized radiation at a plurality of wavelengths and the scatter at a plurality of wavelengths.

* * * * *